Patented June 6, 1933

1,912,894

UNITED STATES PATENT OFFICE

CECIL STEVENSON GARNETT, OF DERBY, ENGLAND

BASIC REFRACTORY BRICK OR OTHER ARTICLE

No Drawing. Application filed July 6, 1931, Serial No. 549,122, and in Great Britain September 13, 1930.

This invention relates to an improved refractory basic brick or other article. The principal object of the invention is to prepare from dolomite a moulded and burnt article having a high melting point, appreciable resistance to hydration, a low tendency to spall, and showing little deformation on burning. Other objects of the invention are to prepare novel agglomerable material from which articles can be moulded; to provide novel addition to moulded articles, especially colloidal aluminous material; to provide novel processes of burning shaped articles whereby deformation is reduced; and other objects which will be apparent from the following detailed description of the invention. The scope of the invention is defined in the appended claims.

It has already been proposed to burn dolomite, to add water to the burnt material and to mould the mass into bricks which are then burned. In U. S. A. Patent 1,751,234 a process has been described in which dolomite is burnt to incomplete dissociation and mixed with substances, preferably natural rocks, which are capable of reducing hydration of the finished article. Bricks made in this way resist hydration but may suffer deformation during the burning of the moulded article. It has also been proposed to dead-burn dolomite, mix the burnt material with tar and mould the mixture into bricks which may be burnt, in which case they are again coated with tar. Such bricks do not resist the action of water as they are liable to hydration.

According to the invention, dolomite (which may or may not have been burned) is caused to react with substances capable of retarding hydration of the finished article, so as to give a material which is then moulded with a non-aqueous liquid such as oil and subjected to a final burning to produce the finished article. In this way there are produced articles composed of a substance which is not susceptible to hydration.

In a preferred form of the invention natural dolomite is lightly burned, finely ground, and substances intended to retard the hydration of the finished article are added, and water is then added to form a mixture which is poured into moulds, when slaking and setting takes place; the roughly shaped masses (such as bricks) are burned, the burnt material is then subdivided by crushing; mixed with a non-aqueous and preferably an oily binder and if desired a small proportion of dolomite lime, moulded by pressing, and burnt. (Dolomite lime is a material obtained by burning dolomite to complete dissociation but not at a temperature high enough to produce dead burnt dolomite). According to a further feature of the invention, the burnt and crushed mass is mixed with oil and a small proportion of finely divided alumina which is preferably colloidally dispersed in the oil. In this preferred form of the invention, three burnings take place.

It is preferred to mix the lightly burnt dolomite (after the first burning) with a substance (preferably a natural rock or rocks) which is adapted to retard hydration of the finished article but does not contain substantial amounts of iron and to mould a mixture of this material with water. This is then burnt at a high temperature (second burning), and crushed with the minimum percussive action (which is believed to cause surface disintegration of the material at a later stage). The graded material is mixed with a small proportion of dolomite lime and then with oil containing colloidal alumina (or bauxite which may contain silicate of alumina but not much iron), moulded and burnt (third and final burning).

The oil is not a mere substitute for water since the crushed material cannot, as far as we have ascertained, be successfully moulded with water at all. The oil reduces the tendency of the mass to hydrate during the final stages of the process of manufacture. This oil should be such as to leave little or no residue of free carbon on destructive distillation under the conditions of working. A suitable oil is Anglo-Persian gas oil, Specific gravity @ 60° F.=0.856
Flashpoint 168° F.
Set point 10° F.
Viscosity @ 70° F. 42 seconds. (Redwood)
Viscosity @ 100° F. 36 seconds.

Although the crushing increases the number of operations required the triple burning has the valuable result that the final moulded articles exhibit practically no distortion on burning. The invention is applicable to the manufacture of bricks, sheets, pipes, etc.

*Example*

Burn dolomite as described in British patent, No. 197,791 and add 6 per cent of kaolin and 6 per cent finely ground labradorite. Mix with water to form a cream, mould, and then burn at about 1500° C. The fired masses are then crushed but only coarsely since it is desired to avoid excessive mechanical stresses and also it is advisable to obtain a graded product, so that the minimum amount of aluminous material is required for bonding. Thus the lumps may be crushed in a jaw crusher till about one-half the particles are about 1 to 6 mm. diameter. About one-half or two-thirds of the finer particles is then crushed further in an edge runner to pass (say) a sieve having 5 to 8 strands per linear centimeter. The fine and coarse materials are then mixed to give a product as dense as possible with a minimum of voids of which 45% is between 6 and 1½ mm. diameter, 17% between 1½ and ¾ mm. diameter and 37% less than ¾ mm. diameter. Add 5% of finely powdered dolomite lime that has been burnt to complete dissociation but not appreciably higher, and 4–5% of a mixture of alumina and kaolin (calculated on the total solids) obtained by disintegration in a colloid mill as finely as possible; this mixture contains for example 1 part of solid to 2 parts of oil. If the dolomite lime is mixed with a small proportion of natural rocks (such as kaolin and labradorite) the addition of the colloidal material is not necessary, but I prefer to add the colloidal material. Anglo-Persian gas oil is then added in amount sufficient to make a mouldable article. Mould under pressure and burn at about 1450° C. or just above. During this final burning deformation must be avoided and it is desirable to avoid superimposing many layers of bricks, at any rate unless very high pressure has been used during the moulding.

It is also possible to use dolomite which has been burned (first burning) to a greater extent than indicated above. But in this case it is not easy to mould the material by addition of the correct quantity of water. Hence the burnt dolomite may be treated with an excess of water; after removal of the excess liquid by means of heat the hydrated material may be subjected to the second burning as above and then crushed prior to moulding with oil and subjection to the third final burning.

In some cases the first burning may be omitted. Thus natural dolomite may be finely powdered and mixed with the natural rocks and water and then burned, for example, in a rotary kiln in slurry or powder form. The clinker is then crushed, moulded with oil, and burned. Here only two instead of three burnings are required. Or the powdered dolomite may be mixed with natural rocks and water and moulded in presence of a binder to form rough masses which may be burned, crushed, moulded with oil and finally burned. (Two burnings in all). The burning of the rough masses has the advantage that it is easier to heat for the long time required that when slurry or powder is burned in a rotary kiln.

It has already been proposed to mould burnt magnesite with oil, to form bricks which are then burnt. The bricks so obtained do not show any tendency to hydration, though they have other disadvantages. Dolomite is much cheaper than magnesite but if it is attempted to burn a mixture of burnt dolomite and oil, the bricks so obtained show a serious tendency to hydration. It is found that by causing the burnt dolomite to react chemically with certain substances (usually containing alumina and silica) in any of the above described ways, and then crushing the product, a new granular or finely divided material is obtained, which appears to resist hydration because the free lime of the burnt dolomite is combined with alumina and silica. When this material in a crushed, granular form, is moulded with oil, and burnt according to the present invention, deformation of the finished article is avoided, whilst the desired properties are retained. This mechanically subdivided material is termed an agglomerable material for brevity to distinguish it from the burnt bricks or masses from which it can be obtained by crushing.

I declare that what I claim is:—

1. As an intermediate product, a mixture of oil with an agglomerable material consisting of burnt dolomite in which the lime is in the combined form.

2. An article shaped from a mixture of oil with burned dolomite containing ingredients adapted to retard hydration of the finished article.

3. Process of making refractory articles by burning a dolomitic mixture containing added substances adapted to retard hydration of the finished article in which the final burning is performed in presence of a non-aqueous liquid binder yielding little or no fixed carbon on destructive distillation under the conditions of working.

4. Process as in claim 3 in which oil is used as binder.

5. Process as in claim 3 in which a colloidal aluminum compound is added to the mixture.

6. In the manufacture of refractory articles from burnt dolomite, the step which consists in adding collodial aluminous material thereto.

7. Process of making refractory articles in which dolomite material is burnt in presence of ingredients adapted to retard hydration of the finished article, the burnt material is subdivided, mixed with oil, shaped into articles and burnt.

8. Process of making refractory articles in which dolomite is burnt to incomplete dissociation, mixed with ingredients adapted to retard hydration of the finished article, shaped into masses with water, whereupon the masses are burnt, subdivided, shaped into articles with an oily binder and finally burnt.

9. The process of manufacturing refractory articles which consists in producing an agglomerable burnt dolomitic material in which the lime is combined with ingredients adapted to retard hydration of the finished article and burning an article shaped therefrom.

10. The process of manufacturing refractory articles from dolomitic material and natural rocks which includes the steps of triple burning with a mechanical subdivision before the final burning.

11. Process as in claim 3 in which the binder consists of a light mineral oil of low viscosity.

In witness whereof, I have hereunto signed my name this 15th day of June, 1931.

CECIL STEVENSON GARNETT.